(12) United States Patent
Vastmans et al.

(10) Patent No.: US 12,276,857 B2
(45) Date of Patent: Apr. 15, 2025

(54) FIBER DISTRIBUTION HUB INCLUDING SEALED SPLICE MODULE

(71) Applicant: COMMSCOPE TECHNOLOGIES LLC, Hickory, NC (US)

(72) Inventors: Kristof Vastmans, Kessel-Lo (BE); Jiri Zavrel, Leuven (BE); Birgitte Koefoed, Valby (DK); John Townley Porsborg, Jaegerspris (DK)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/766,982

(22) PCT Filed: Oct. 6, 2020

(86) PCT No.: PCT/US2020/054413
§ 371 (c)(1),
(2) Date: Apr. 6, 2022

(87) PCT Pub. No.: WO2021/071844
PCT Pub. Date: Apr. 15, 2021

(65) Prior Publication Data
US 2024/0077691 A1    Mar. 7, 2024

Related U.S. Application Data

(60) Provisional application No. 62/911,577, filed on Oct. 7, 2019.

(51) Int. Cl.
*G02B 6/44* (2006.01)
(52) U.S. Cl.
CPC ......... *G02B 6/4452* (2013.01); *G02B 6/4444* (2013.01); *G02B 6/44528* (2023.05); *G02B 6/4454* (2013.01); *G02B 6/44775* (2023.05)

(58) Field of Classification Search
CPC .. G02B 6/4452; G02B 6/4439; G02B 6/4441; G02B 6/4442; G02B 6/4444;
(Continued)

(56) References Cited

U.S. PATENT DOCUMENTS 6,792,191 B1 * 9/2004 Clapp, Jr. ............ G02B 6/4452
385/135
6,802,724 B1   10/2004 Mahony
(Continued)

FOREIGN PATENT DOCUMENTS

CN    208367282 U  *  1/2019
EP    3 528 023 A1    8/2019
(Continued)

OTHER PUBLICATIONS

Extended European Search Report for Application No. 20874563.8 mailed Sep. 22, 2023.
(Continued)

*Primary Examiner* — Michelle R Connelly
*Assistant Examiner* — Kirsten D. Endresen
(74) *Attorney, Agent, or Firm* — Merchant & Gould P.C.

(57) ABSTRACT

A cabinet includes a first compartment coupled to a second compartment with a sealed cable port arrangement separating the two compartments. The second compartment is more robustly sealed than the first compartment. A sealed splice enclosure is disposed in the first compartment. The splice enclosure is more robustly sealed against water intrusion than the second compartment.

20 Claims, 6 Drawing Sheets

(58) Field of Classification Search
CPC .......................... G02B 6/4445; G02B 6/4446;
G02B 6/44465; G02B 6/4447; G02B
6/445; G02B 6/44515; G02B 6/44526;
G02B 6/44528; G02B 6/4453; G02B
6/4454; G02B 6/4455

See application file for complete search history.

(56) References Cited

U.S. PATENT DOCUMENTS

| | | | |
|---|---|---|---|
| 6,983,095 B2 | 1/2006 | Reagan et al. | |
| 7,200,317 B2 | 4/2007 | Reagan et al. | |
| 7,277,620 B2 | 10/2007 | Vongseng et al. | |
| 7,369,741 B2 | 5/2008 | Reagan et al. | |
| 7,460,759 B2 | 12/2008 | Reagan et al. | |
| 7,583,885 B2 | 9/2009 | Kowalczyk et al. | |
| 7,623,749 B2 | 11/2009 | Reagan et al. | |
| 7,711,234 B2 | 5/2010 | Smith et al. | |
| 7,720,343 B2 | 5/2010 | Barth et al. | |
| 7,728,225 B2 | 6/2010 | Anderson et al. | |
| 7,751,672 B2 | 7/2010 | Smith et al. | |
| 7,760,984 B2 | 7/2010 | Solheid et al. | |
| 7,873,255 B2 | 1/2011 | Reagan et al. | |
| 8,569,618 B2 | 10/2013 | Andry et al. | |
| RE44,758 E | 2/2014 | Allen et al. | |
| 8,649,649 B2 | 2/2014 | Smith et al. | |
| 8,873,922 B2 | 10/2014 | Kowalczyk et al. | |
| 8,891,927 B2 | 11/2014 | Leblanc et al. | |
| 9,946,044 B1* | 4/2018 | Gralewski-Sek | G02B 6/44524 |
| 10,409,020 B2 | 9/2019 | Geens et al. | |
| 2007/0036507 A1 | 2/2007 | Allen et al. | |
| 2008/0068798 A1* | 3/2008 | Hendrix | H05K 7/206 |
| | | | 361/692 |
| 2011/0235986 A1* | 9/2011 | Kaml | G02B 6/4453 |
| | | | 385/135 |
| 2012/0093474 A1 | 4/2012 | Cox et al. | |
| 2014/0112631 A1 | 4/2014 | Namazue et al. | |
| 2016/0116697 A1 | 4/2016 | Kostecka et al. | |
| 2017/0031121 A1 | 2/2017 | Blazer et al. | |
| 2017/0235068 A1 | 8/2017 | Debban et al. | |
| 2018/0011271 A1 | 1/2018 | Reagan et al. | |
| 2018/0224618 A1 | 8/2018 | Burkett et al. | |
| 2019/0072736 A1 | 3/2019 | Glatzl et al. | |
| 2019/0101702 A1* | 4/2019 | Li | G02B 6/381 |

FOREIGN PATENT DOCUMENTS

| | | | |
|---|---|---|---|
| WO | 2014/118227 A1 | 8/2014 | |
| WO | 2014/207210 A1 | 12/2014 | |
| WO | 2016/012550 A2 | 1/2016 | |
| WO | WO-2017133764 A1 * | 8/2017 | .......... G02B 6/4447 |
| WO | WO-2018172378 A1 * | 9/2018 | .......... G02B 6/4446 |

OTHER PUBLICATIONS

International Search Report and Written Opinion of the International Searching Authority for International Patent Application No. PCT/US2020/054413 mailed Jan. 29, 2021, 9 pages.

OmniReach® Fiber Distribution Hub Gen3E FDH Cabinet User Manual, ADC Telecommunications, Inc., ADCP-96-119(1): 1-70 (Mar. 2009).

OmniReach® Outdoor FDH 3000 288 Termination Cabinet With Pre-installed Cables User Manual, ADC Telecommunications, Inc., ADCP-96-085(4): 1-58 (Sep. 2009).

FTTX Solutions: Outdoor FDH 3000, Product Catalog, CommScope, Inc., 2nd Edition: 1-16 (2015).

* cited by examiner

FIBER DISTRIBUTION HUB INCLUDING SEALED SPLICE MODULE

CROSS-REFERENCE TO RELATED APPLICATION

This application is a National Stage Application of PCT/US2020/054413, filed on 6 Oct. 2020, which claims the benefit of U.S. patent application Ser. No. 62/911,577, filed on Oct. 7, 2019, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

In certain examples, a network can include a central office that connects a number of end subscribers (also called end users herein) in a network. The central office can additionally connect to a larger network such as the Internet (not shown) and a public switched telephone network (PSTN). The network also can include fiber distribution hubs (FDHs) having one or more optical splitters (e.g., 1-to-8 splitters, 1-to-16 splitters, or 1-to-32 splitters) that generate a number of individual fibers that may lead to the premises of an end user. The various lines of the network can be aerial or housed within underground conduits.

Each FDH receives a feeder line (of one or more optical cables) that connects the FDH to the central office. Each FDH outputs one or more distribution cables towards the end users. Splitters used in an FDH can accept a feeder cable having a number of fibers and may split those incoming fibers onto fibers of the distribution cable(s) that may be associated with end user locations. In typical applications, an optical splitter is provided prepackaged in an optical splitter module housing and provided with a splitter output in pigtails that extend from the module. The splitter output pigtails are typically connectorized. The optical splitter module provides protective packaging for the optical splitter components in the housing and thus provides for easy handling for otherwise fragile splitter components. This modular approach allows optical splitter modules to be added incrementally to FDHs as required.

The network includes a plurality of break-out locations at which branch cables are separated out from the main distribution cable lines. Branch cables are often connected to drop terminals that include connector interfaces for facilitating coupling of the fibers of the branch cables to a plurality of different subscriber locations.

SUMMARY

Some aspects of the disclosure are directed to a cabinet having a first compartment sealingly separated from a second compartment. The second compartment is more robustly sealed than the first compartment. An optical termination region is disposed within the second compartment. Optical splitters also may be disposed within the second compartment. A separate enclosure is disposed in the first compartment. The enclosure is sealed more robustly than the second compartment.

In certain implementations, the cabinet is a fiber distribution hub.

In certain implementations, feeder cable fibers entering the cabinet remain within the first compartment. In certain examples, the feeder cable fibers remain within a portion of the first compartment buried under ground level G. In certain examples, overlength storage (e.g., for the feeder cable) is provided in the first compartment.

In certain implementations, the separate enclosure is a splice enclosure at which the feeder cable fibers can be spliced to pigtails extending between the first and second compartments. In certain examples, distribution cable fibers also may extend between the first and second compartments.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
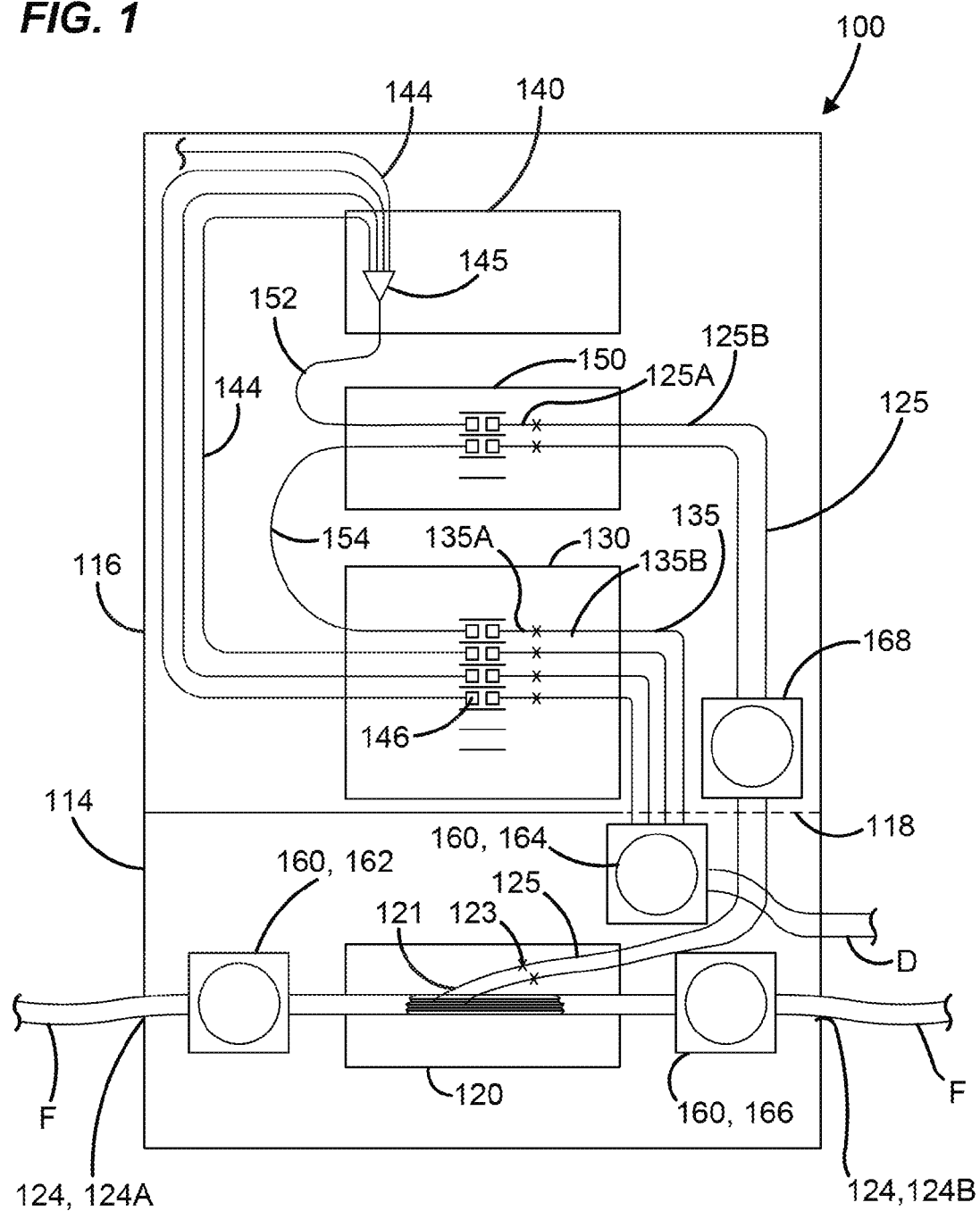
FIG. 1 is a schematic diagram showing an example cable routing scheme for a cabinet configured in accordance with the principles of the present disclosure.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cabinet 100 including a sealed compartment 116 and an unsealed compartment 114. A subscriber termination field is disposed in the sealed compartment 116. A sealed splice enclosure 120 is disposed in the unsealed compartment 114. Cables (e.g., first pigtails) are routed between the sealed splice enclosure 120 and the sealed compartment 116. For example, the cables may be routed through a sealed cable port arrangement 118 disposed between the sealed and unsealed compartments 116, 114. The cables are optically coupled (e.g., fusion spliced) to fibers of one or more feeder cables F at the splice enclosure 120.

A sealed cable port arrangement 118 provides sealed cable access between the interiors of the sealed and unsealed compartments 116, 114. In some implementations, the sealed cable port arrangement 118 includes a first sealed cable port extending between the sealed and unsealed compartments 116, 114. In other implementations, the sealed cable port arrangement 118 includes multiple sealed cable ports extending between the sealed and unsealed compartments 116, 114.

FIG. 1 is a schematic diagram showing an example cable routing scheme for the cabinet 100. The cabinet 100 generally administers connections at a termination region between incoming fiber (e.g., feeder cable fibers) and outgoing fiber (e.g., distribution cable fibers) in an Outside Plant (OSP) environment. As the term is used herein, "a connection" between fibers includes both direct and indirect connections. The cabinet 100 provides an interconnect interface for optical transmission signals at a location in the network where operational access and reconfiguration are desired. For example, the cabinet 100 can be used to split the feeder cables and terminate the split feeder cables to distribution cables routed to subscriber locations. In addition, the cabinet 100 is designed to accommodate a range of alternative sizes and fiber counts and support factory installation of pigtails, fanouts and splitters.

Various pieces of communications equipment are disposed within the sealed compartment 116. In certain implementations, a subscriber termination region 130 is disposed within the sealed compartment 116. In certain implementations, a splitter mounting region 140 is disposed within the sealed compartment 116. In certain implementations, a feeder connection region 150 is disposed within the sealed compartment 116.

In certain implementations, internal optical circuitry can be pre-cabled within the sealed compartment 116 to optically couple together equipment at the various regions. For example, first pigtails 125 may be routed between the splice enclosure 120 and the feeder connection region 150. In certain examples, each first pigtail 125 extends between a connectorized end and an unconnectorized end. The connectorized end of the first pigtail is disposed at the feeder cable connection region 150 (e.g., plugged into a first port of an optical adapter). The unconnectorized end of each of the first pigtails 125 is disposed at the splice enclosure 120. In an example, a first pigtail includes a processed stub fiber 125A forming the connectorized end and a length of optical fiber 125B forming the unconnectorized end. The processed stub fiber 125A is fusion spliced to the length of optical fiber 125B (e.g., at the factory) prior to deployment of the cabinet 100. Accordingly, the connectorization of the first pigtails 125 (e.g., the polishing of the optical fiber end faces and assembly of the plug connectors) can be performed in advance of cabling the cabinet 100.

In general, the sealed compartment 116 is configured to protect the internal components against rain, wind, dust, rodents and other contaminants. However, the sealed compartment 116 remains relatively lightweight for easy installation, and breathable to prevent accumulation of moisture in the unit. In some embodiments, an aluminum construction with a heavy powder coat finish also provides for corrosion resistance. In one example embodiment, the sealed compartment 116 is manufactured from heavy gauge aluminum and is NEMA-4X rated. In other embodiments, however, other materials can also be used.

In certain examples, the interior of the sealed compartment 116 has a water resistance rating of at least 2, but no more than 6. In certain examples, the interior of the sealed compartment 116 has a water resistance rating of at least 3, but no more than 5. In certain examples, the interior of the sealed compartment 116 has a water resistance rating of at least 4, but no more than 5. In certain examples, the interior of the sealed compartment 116 has a solids resistance rating of at least 2, but no more than 6. In certain examples, the interior of the sealed compartment 116 has a solids resistance rating of at least 3, but no more than 5. In certain examples, the interior of the sealed compartment 116 has a solids resistance rating of at least 4, but no more than 5. In an example, the interior of the sealed compartment 116 has an ingress protection rating of IP54. In an example, the interior of the sealed compartment 116 has an ingress protection rating of IP55.

In certain implementations, the splice enclosure 120 is sealed against water intrusion. In certain implementations, the splice enclosure 120 is more robustly sealed than the sealed compartment. In certain examples, the splice enclosure 120 is more robustly sealed against water than the sealed compartment. In certain examples, the splice enclosure 120 if more robustly sealed against dust or dirt than the sealed compartment.

In certain examples, the interior of the splice enclosure 120 has a water resistance rating of at least 6. In certain examples, the interior of the splice enclosure 120 has a water resistance rating of at least 7. In an example, the interior of the splice enclosure 120 has a water resistance rating of at least 8. In certain examples, the interior of the splice enclosure has a solids resistance rating of at least 4. In certain examples, the interior of the splice enclosure 120 has a water resistance rating of at least 5. In an example, the interior of the splice enclosure 120 has a water resistance rating of at least 6. In an example, the interior of the splice enclosure 120 has an ingress protection rating of IP68.

Figure 2:
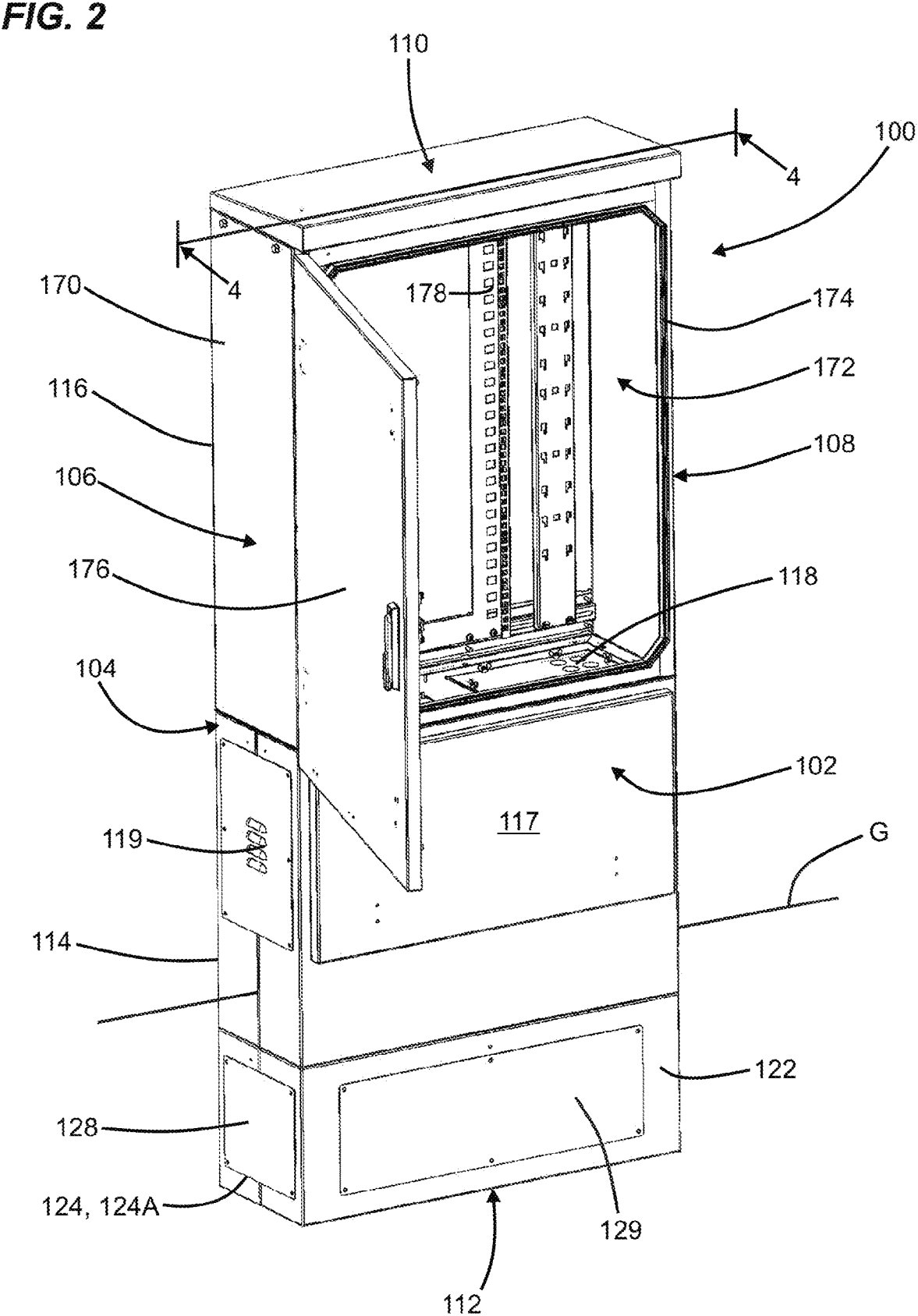
FIG. 2 is a perspective view of an example cabinet configured in accordance with the principles of the present disclosure, the cabinet including first and second compartments, the second compartment including a door shown in the open position for ease in viewing an interior of the second compartment.

As shown at FIG. 2, a feeder cable F and a distribution cable D are routed into the cabinet 100 through the unsealed compartment 114. For example, the unsealed compartment 114 defines one or more cable access ports 124 leading from an exterior of the cabinet 100 to the unsealed compartment 114. In certain implementations, the feeder cable F is routed into the unsealed compartment 114 and then out of the unsealed compartment 114 towards a subsequent cabinet or other node in the communications network. In some examples, the feeder cable F is routed into and out of the unsealed compartment 114 in a butt-end configuration. In other examples, the feeder cable F extends into the unsealed compartment 114 through a first cable access port 124A and out of the unsealed compartment 114 through a second cable access port 124B. In some implementations, the distribution cable D is routed into the unsealed compartment 114 through the same cable access port 124 as the feeder cable F. In other implementations, the distribution cable D is routed into the unsealed compartment 114 through a separate cable access port 124.

At least part of the unsealed compartment 114 is disposed beneath the ground level G. In certain implementations, the cable access ports 124, 124A, 124B are disposed beneath the ground level G. Accordingly, feeder cables F and/or subscriber cables D routed through underground conduits may enter the unsealed compartment without leaving the ground. In certain implementations, the splice enclosure 120 also is disposed in the part of the unsealed compartment 114 that is buried underground. By locating the splice enclosure 120 underground, the fibers of the feeder cable F that are not broken out and routed to the sealed compartment 116 may continue downstream in the network without leaving the protection of being underground.

Accordingly, even when the sealed compartment 116 is damaged (e.g., by being hit by a car, being hit by a tree, vandalism, etc.), the buried part of the unsealed compartment 114 may remain undamaged. If the feeder cable F remains undamaged, then signals can still be passed to downstream hubs and equipment coupled to the feeder cable F routed out of the cabinet 100. Therefore, signal disruption would be limited to only the subscribers connected to the equipment within the cabinet 100.

As noted above, the feeder cable F is routed into the cabinet 100 (e.g., typically through the back or bottom of the cabinet 100) through the cable access ports 124. An example feeder cable F may include twelve, twenty-four, forty-eight, or even more individual fibers connected to a service provider central office. In certain embodiments, the fibers of the feeder cable F can include ribbon fibers, loose ribbon fibers, or stranded fibers. As the term is used herein, a "loose ribbon" refers to a set of fibers that are loosely coupled together at various intervals along their length. Examples of loose ribbons are disclosed in U.S. Publication Nos. 2014/0112631, 2017/0235068, and 2017/0031121, the disclosures of which are hereby incorporated herein by reference. Other examples of loose ribbons of fibers include the Rollable Ribbons™ produced by OFS Furukawa of Norcross, GA, the Spiderweb® Ribbon produced by AFL Telecommunications, LLC of Duncan, SC, and the RocketRibbon® produced by Corning Optical Communications LLC of Hickory, NC.

In some implementations, after entering the cabinet 100, the fibers of the feeder cable F are optically coupled (e.g., fusion spliced) to first pigtails 125 routed to the feeder connection region 150 (e.g., fiber optic adapter modules, a splice tray, etc.). For example, one or more fibers 121 of the feeder cable F may be optically spliced to respective first pigtails 125 at splice locations 123 within the splice enclosure 120. In some implementations, overlength of the first pigtails 125 may be stored within the unsealed compartment 114. In other implementations, overlength of the first pigtails 125 may be stored within the sealed compartment 116. For example, a cable management arrangement 168 (e.g., one or more spools, one or more half-spools or other bend radius limiters, etc.) may be disposed within the sealed compartment 116.

At the feeder connection region 150, one or more of the first pigtails 125 are individually connected to separate splitter input fibers 152 or pass-through fibers 154. The splitter input fibers 152 are routed from the feeder interface region 150 to the splitter module mounting region 140. The splitter input fibers 152 are connected to separate splitter modules 145, wherein the input fibers 152 are each split into multiple splitter pigtails 144, each having connectorized ends 146 that may be received at the subscriber termination region 130. Alternatively, the pass-through fibers 154 are routed between the fiber connection region 150 and the subscriber termination region 130, thereby leaving the optical signals carried over the pass-through fibers 154 unsplit. By refraining from splitting a fiber line, a stronger signal can be sent to one of the subscribers.

The one or more distribution cables D also are routed into the cabinet (e.g., through the cable access ports 124). An example distribution cable D may include twelve, twenty-four, forty-eight, 144, 288, 384, 432, or even more fibers each connected to one or more subscribers. In certain examples, the fibers of the distribution cable D can include ribbon fibers, loose ribbon fibers, or stranded fibers. Each of the fibers of the distribution cable D is routed to the subscriber termination region 130 to be connected to either a splitter pigtail 144 or a pass-through fiber 154.

In certain implementations, excess length of the feeder cables F and/or distribution cables D can be stored within the unsealed compartment 114. In some examples, a cable management arrangement 160 can be disposed within the unsealed compartment 114 to retain excess length of the feeder cable F, the distribution cables D, or both. In certain examples, separate cable management arrangements 162, 164 can be provided for the feeder cable F and the distribution cables D, respectively. In certain examples, separate cable management arrangements 162, 166 are provided for the feeder cable F entering the cabinet 100 and the feeder cable F leaving the cabinet 100. In other implementations, a single cable management arrangement (e.g., a spool, bend radius limiter, etc.) is provided above a center of the splice enclosure 120.

Alternatively, in certain implementations, the fibers of the feeder cables F and/or the distribution cables D are optically coupled to respective stub cables extending from the cabinet 100. In various embodiments, the stub cables range in length from about 25 feet to about 300 feet. A first stub cable, which is spliced to the feeder cable F at a location outside of the cabinet 100, extends through the unsealed compartment 114 and into the splice enclosure 120. In certain examples, the first stub cable extends from the splice enclosure 120, back out of the unsealed compartment 114, and to another feeder cable segment to be routed downstream in the network.

One or more additional stub cables may be spliced to respective distribution cables outside of the cabinet 100. In such examples, connectorized ends of the stub distribution fibers (e.g., fibers 135) can be routed to the subscriber termination region 130 (e.g., at the factory) prior to deployment of the cabinet 100. In an example, a stub distribution fiber 135 includes a processed stub fiber 135A forming the connectorized end and a length of optical fiber 135B forming the remainder of the stub distribution fiber 135. The processed stub fiber 135A is fusion spliced to the length of optical fiber 135B (e.g., at the factory) prior to deployment of the cabinet 100. Accordingly, the connectorization of the stub distribution fibers 135 (e.g., the polishing of the optical fiber end faces and assembly of the plug connectors) can be performed in advance of cabling the cabinet 100.

Figure 3:
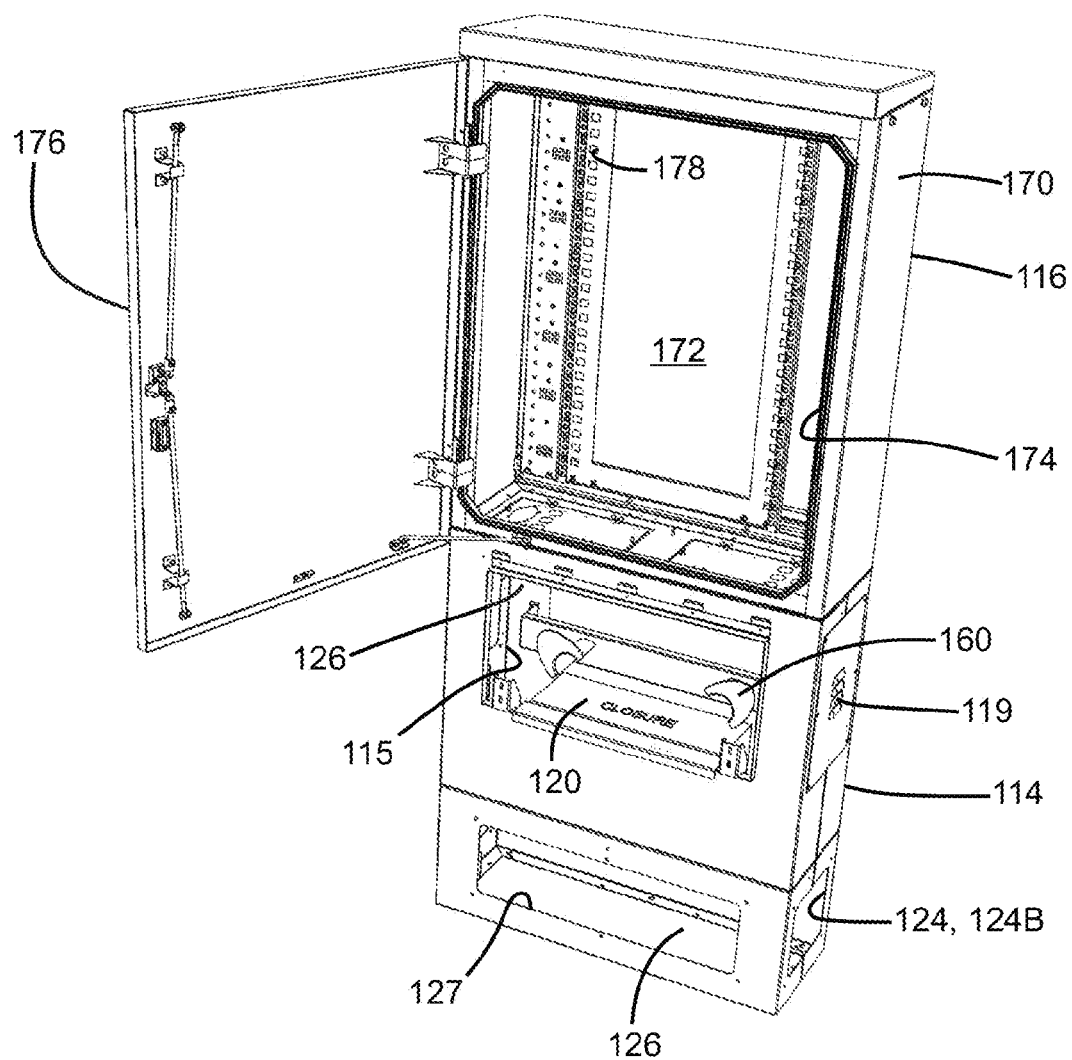
FIG. 3 is another perspective view of the cabinet of FIG. 2 with several covers removed for ease in viewing portions of the interior of the first compartment.
Figure 4:
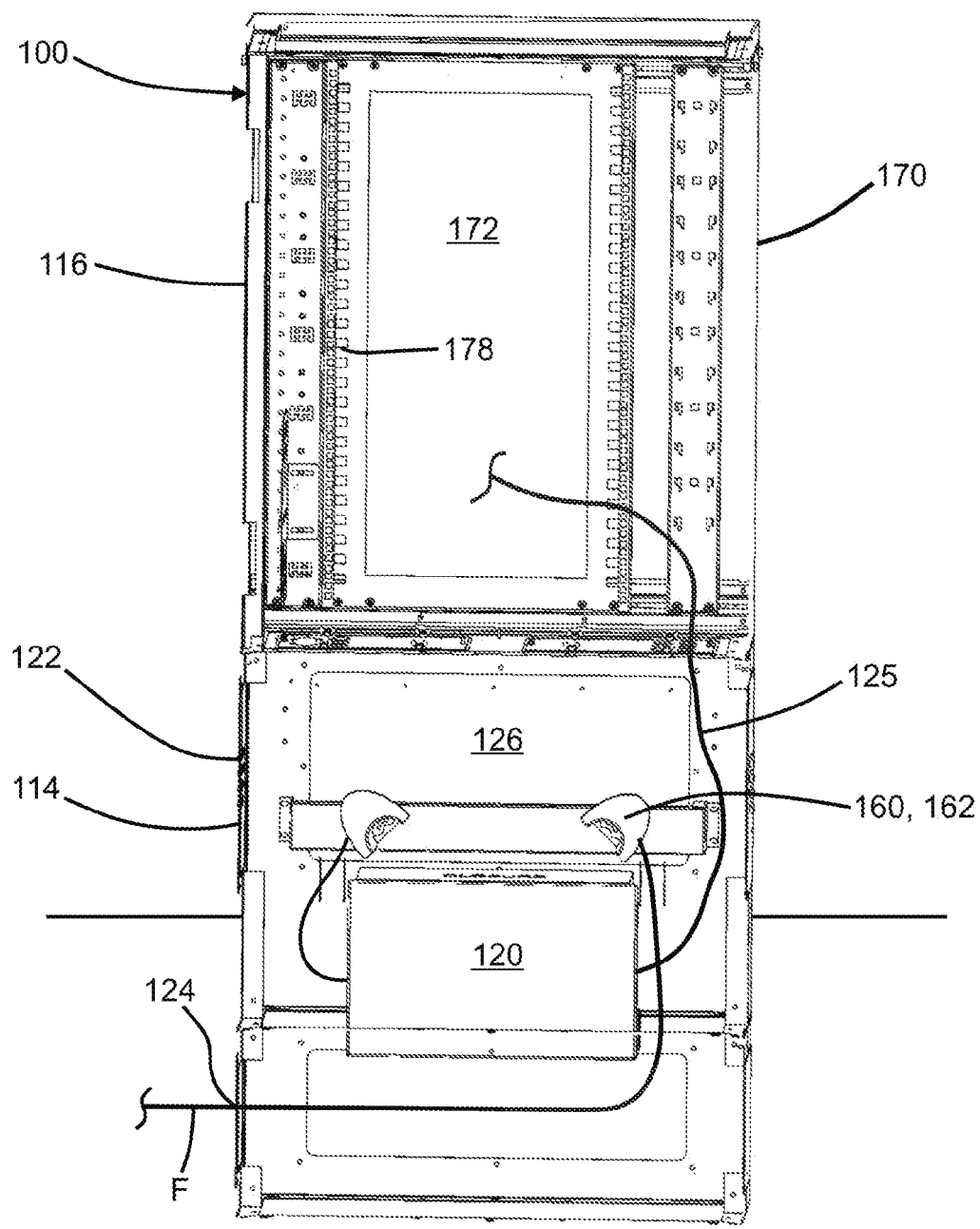
FIG. 4 is a front elevational view of a cross-section of the cabinet taken along the 4-4 plane of FIG. 2.

FIGS. 2-4 illustrate an example implementation of the cabinet 100 configured in accordance with the principles of the present disclosure. The cabinet 100 has a depth extending between a front 102 and a rear 104, a width extending between a first side 106 and a second side 108, and a height extending between a top 110 and a bottom 112. The first (unsealed) compartment 114 forms the bottom 112 of the cabinet 100 and the second (sealed) compartment forms the top 112 of the cabinet 100. The first compartment 114 is configured to mount at least partially below ground level G. The second compartment 116 is configured to remain above the ground level G.

The first compartment 114 includes a first body 122 defining an unsealed interior 126. In certain examples, vents 119 are provided at the first body 122 to inhibit accumulation of moisture within the interior of the first compartment 114. At least one cable access port 124 leads from an exterior of the first compartment 114 to the unsealed interior 126. In the example shown, the first body 122 defines a first cable access port 124A at the first side 106 of the body 122 and a second cable access port 124B at the second side 108 of the body 122. The first body 122 is installed so that the vents 119 are disposed above ground while the cable access ports 124 are disposed below ground.

Caps 128 can be mounted to the body 122 to close any unused cable access ports 124, 124A, 124B. In certain examples, the body 122 may define another opening 127 (FIG. 3) at a front or rear of the cabinet 100 below ground level G. In the example shown, the opening 127 is disposed at the front 102 of the first body 122 between the cable access ports 124, 124A, 124B. The opening 127 may be utilized as another cable access port or as a hand access port to facilitate routing the feeder and/or distribution cables F, D into the first compartment 114. A panel 129 removably mounts over the opening 127.

The body 122 of the first compartment 114 also defines an access opening 115 (FIG. 3) through which a user may access the splice enclosure 120. In certain examples, the access opening 115 is located above ground level G. In certain examples, the access opening 115 is sufficiently large to install and/or remove the splice enclosure within the first compartment 114. For example, the access opening 115 may lead to a platform disposed within the first compartment 114. The splice enclosure 120 may be seated on the platform. In certain examples, the access opening 115 is sufficiently large to allow a user to access the interior of the splice enclosure 120 while the splice enclosure 120 remains within the first compartment 114. In certain examples, the access opening 115 provides a user with access to the sealed cable port arrangement 118 through the first compartment 114. In certain examples, the access opening 115 provides a user with access to the various overlength storage arrangements 160, 162, 164, 166 disposed within the first compartment 114. A cover 117 removably mounts over the access opening 115 to inhibit contaminants (e.g., dust, dirt, etc.) from entering the first compartment 114 (see FIG. 2).

The second compartment 116 including a second body 170 defining an interior 172 disposed above the ground level G. The interior 172 of the second body 170 is accessible through a second access opening 174. The second compartment 116 also includes a second door 176 to selectively cover the second access opening 174. A gasket is disposed between the second body 170 and the door 176 at the second access opening 174 to sealingly close the interior 172 of the second body 170. As noted above, the interior 172 of the second body 170 is less robustly sealed (e.g., against water intrusion) than the interior of the splice enclosure 120.

Figure 5:
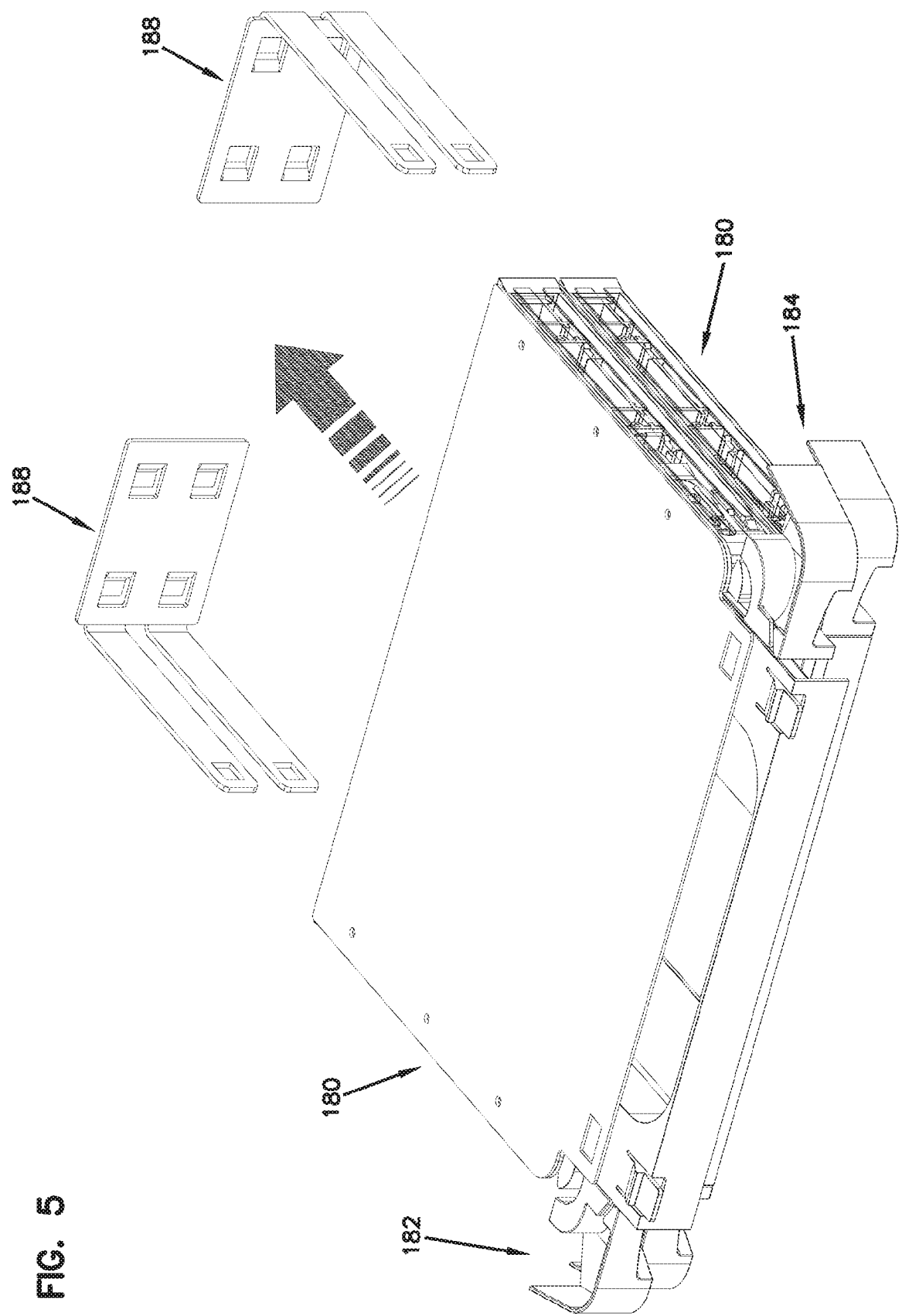
FIG. 5 is a perspective view of an example optical fiber device suitable for mounting within the second compartment, the optical fiber device shown exploded from example mounting brackets.
Figure 6:
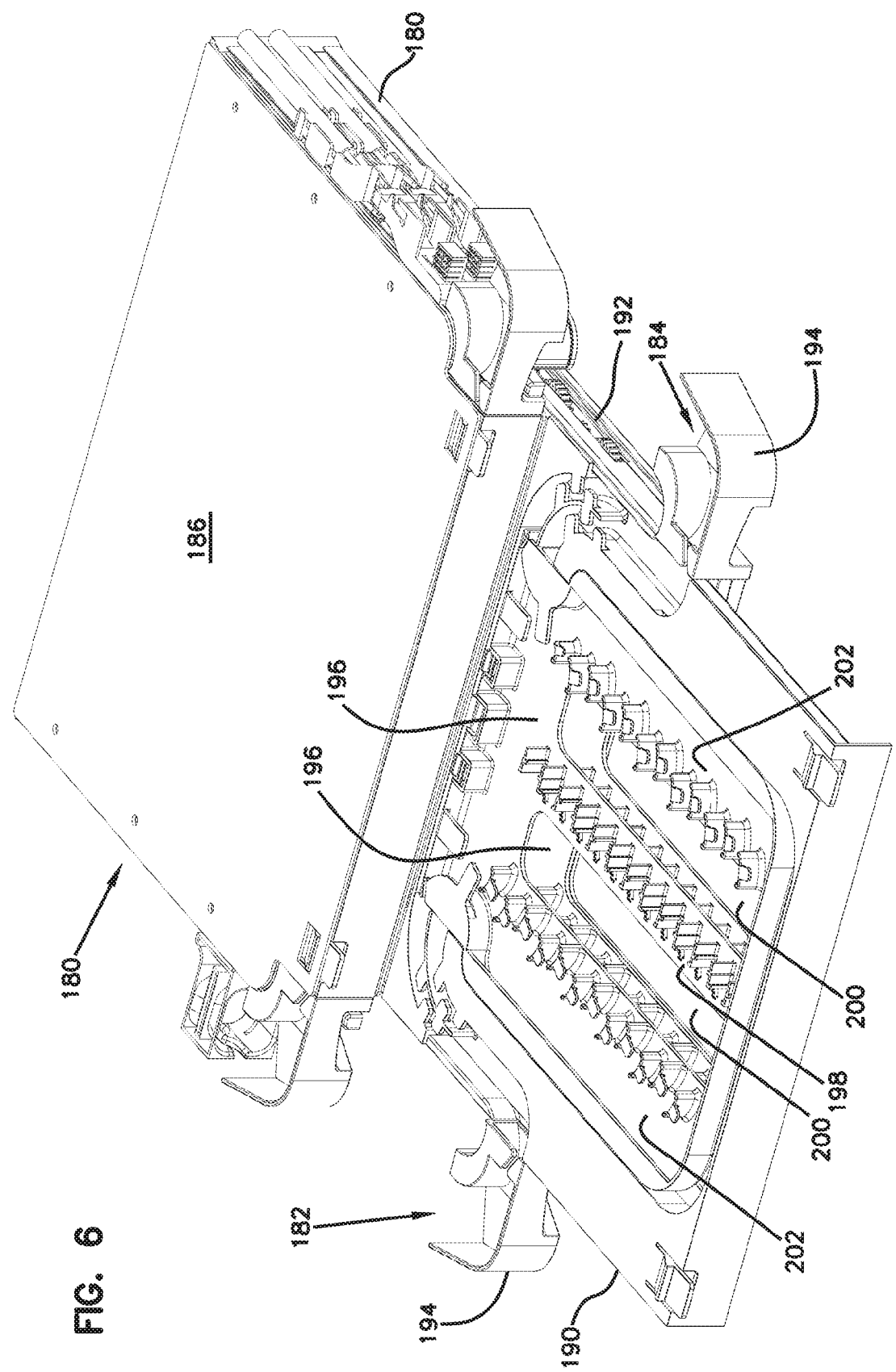
FIG. 6 is a perspective view of the optical fiber device of FIG. 5 shown with one of the trays in an open position relative to the chassis.

In certain implementations, a frame 178 is disposed within the interior 172 of the second body 170. One or more optical fiber devices 180 (e.g., see FIG. 5) are mounted to the frame 178. An optical fiber device 180 has a first side 182 and an opposite second side 184 at which cables may enter or exit the device 180. Such fiber devices 180 may be configured for use as patch panels to connect first fibers entering one side 182, 184 of the fiber device 180 to second fibers entering an opposite side 184, 182 of the fiber device 180.

For example, in certain implementations, one or more of the optical fiber devices 180 may form the subscriber termination field. Optical adapters carried within the one or more optical fiber devices 180 may connect splitter pigtail fibers 144 or pass-through fibers 154 entering one side 182, 184 to distribution cable fibers 135 entering an opposite side 184, 182 of the fiber device 180. In certain implementations, one or more of the optical devices 180 may form the feeder connection region 130. For example, the optical adapters carried within the optical devices 180 may connect first pigtails 125 entering from one side 182, 184 to splitter input fibers 152 or pass-through fibers 154 entering from the other side 184, 182.

In certain implementations, the optical fiber devices 180 are mounted to the frame 178 using mounting brackets 188. Examples of suitable mounting brackets are disclosed in U.S. Pat. No. 10,409,020, the disclosure of which is hereby incorporated herein by reference in its entirety.

In certain implementations, an optical fiber device 180 includes a chassis 186 and a movable tray 190 mounted with a slide mechanism 192 which promotes synchronized movement of radius limiters 194. Each tray 190 carries optical adapters, splice holders, or other fiber connection components. In the example shown, each tray 190 includes two hingedly mounted frame members 196. Each frame member 196 has a middle portion 198 separated by openings 200 from side portions 202. Middle portion 198 can hold fiber terminations. Side portions 202 include radius limiters.

Examples of suitable fiber devices 180 are described in PCT Patent Application Serial Nos. PCT/EP2014/051714, filed Jan. 29, 2014; PCT/EP2014/063717, filed Jun. 27, 2014; and PCT/EP2015/066899, filed Jul. 23, 2015, the entireties of which are hereby incorporated herein by reference.

In some implementations, one or more cable management devices may be mounted to the frame 178 (or other vertical support surfaces) separate from the optical fiber devices 180. The cable management devices may include spools, bend radius limiters, fiber retention fingers, tie-wrap supports, and the like. In other implementations, these cable management devices may be carried by the optical fiber devices 180.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cabinet comprising:
 a first compartment configured to mount at least partially below ground level, the first compartment including a first body defining a vented interior, at least one cable access port, and a first access opening separate from the at least one cable access port, the first compartment also including a first door that selectively covers the first access opening;
 a splice enclosure disposed within the vented interior of the first body, the splice enclosure being accessible to a user through the first access opening when the first door is removed from the first body, the splice enclosure defining a selectively accessible interior sealed against water intrusion, including complete submersion below 1 meter for at least 30 minutes, when closed;
 a second compartment mounted to the first compartment, the second compartment including a second body defining an interior disposed above the ground level, the interior of the second body being accessible through a second access opening, the second compartment also including a second door to selectively cover the second access opening to sealingly close the interior of the second body, the interior of the second body being sealed against water intrusion up to a lesser degree than the interior of the splice enclosure including splashes from any direction;

a sealed cable port arrangement providing sealed cable access between the interiors of the first and second bodies; and a subscriber termination region disposed within the sealed interior of the second compartment.

2. The cabinet of claim 1, wherein the interior of the splice enclosure has an ingress protection rating of IP68.

3. The cabinet of claim 1, wherein the interior of the second body has an ingress protection rating of IP55.

4. The cabinet of claim 1, wherein the interior of the second body has an ingress protection rating of IP54.

5. The cabinet of claim 1, further comprising:
a feeder cable connection region disposed within the interior of the second body; and
a plurality of first pigtails each extending between a connectorized end and an unconnectorized end, the connectorized end of each of the first pigtails being disposed at the feeder cable connection region, the unconnectorized end of each of the first pigtails being disposed at the splice enclosure.

6. The cabinet of claim 5, wherein each of the first pigtails includes a processed stub fiber forming the connectorized end and a length of optical fiber forming the unconnectorized end, the processed stub fiber being fusion spliced to the length of optical fiber prior to deployment of the cabinet.

7. The cabinet of claim 5, further comprising a patchcord extending between opposite first and second connectorized ends, the first connectorized end being received at the feeder cable connection region and the second connectorized end being received at the subscriber termination region.

8. The cabinet of claim 1, further comprising a splitter mounting region disposed within the interior of the second body.

9. The cabinet of claim 8, further comprising an optical splitter module disposed at the splitter mounting region, the optical splitter module being configured to split optical signals received at an input into a plurality of outputs.

10. The cabinet of claim 9, wherein the outputs include connectorized pigtails extending from the optical splitter module, each of the connectorized pigtails being sufficiently long to reach the subscriber termination region.

11. The cabinet of claim 1, further comprising a cable storage region disposed within the unsealed interior of the first body.

12. The cabinet of claim 11, further comprising a plurality of storage members disposed in the cable storage region.

13. The cabinet of claim 11, wherein the cable storage region is a first cable storage region; and wherein a second cable storage region is disposed in the interior of the second body.

14. The cabinet of claim 1, wherein the at least one cable access port of the first compartment includes oppositely facing first and second cable access ports.

15. The cabinet of claim 1, wherein the subscriber termination region includes a plurality of optical adapters.

16. The cabinet of claim 15, wherein the optical adapters are disposed within one or more modules mounted at the subscriber termination region.

17. The cabinet of claim 16, wherein optical splices are disposed within the modules.

18. The cabinet of claim 16, wherein the modules are movable relative to the second body.

19. The cabinet of claim 18, wherein the modules are individually slidable relative to the second body.

20. The cabinet of claim 16, wherein each module includes cable management guide channels that provide cable access to an interior of the module.

* * * * *